United States Patent
Lee et al.

(10) Patent No.: US 8,470,494 B2
(45) Date of Patent: Jun. 25, 2013

(54) MEMBRANE ELECTRODE ASSEMBLY FOR FUEL CELL, METHOD FOR MAKING THE SAME, AND FUEL CELL SYSTEM INCLUDING THE SAME

(75) Inventors: Han-Kyu Lee, Suwon-si (KR); Ho-Jin Kweon, Suwon-si (KR); Kah-Young Song, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 893 days.

(21) Appl. No.: 12/384,373

(22) Filed: Apr. 3, 2009

(65) Prior Publication Data
US 2009/0286124 A1 Nov. 19, 2009

(30) Foreign Application Priority Data
May 13, 2008 (KR) ........................ 10-2008-0043947

(51) Int. Cl.
*H01M 8/10* (2006.01)
(52) U.S. Cl.
USPC ............ 429/483; 429/492; 429/507; 429/508
(58) Field of Classification Search
USPC .................................. 429/492, 507, 508, 483
See application file for complete search history.

(56) References Cited

U.S. PATENT DOCUMENTS
2007/0134538 A1 6/2007 Yuichi et al.
2007/0190400 A1 8/2007 Buche et al.

FOREIGN PATENT DOCUMENTS
EP  0 690 519 A1  1/1996
JP  08-013179  1/1996
JP  2006-339022  12/2002
JP  2006-107798  4/2006
JP  2007-503688  2/2007
JP  2007-157420  6/2007
KR  10-2005-0044228  5/2005

OTHER PUBLICATIONS

European Search Report dated Sep. 18, 2009, for corresponding European application 09251115.3, noting listed references in this IDS.
SIPO Office action dated Apr. 20, 2011, for corresponding Chinese Patent application 200910132200.1, with English translation, noting Japanese reference previously submitted in an IDS dated Feb. 11, 2010.
EPO Office Action for corresponding European Patent Application No. 09251115.3, dated May 26, 2011, 4 pgs.
EP Office Action dated Apr. 13, 2012 issued in corresponding EP Application No. 09 251 115.3-1227, 5 pages.
Japanese Office action dated May 1, 2012 issued in corresponding Japanese Application No. 2009-013980, 2 pages.
SIPO Rejection Decision, with English translation, dated Sep. 22, 2011 for corresponding Chinese Patent Application No. 200910132200.1, 12 pages.
Japanese Notice of Allowance dated Nov. 27, 2012, for corresponding Japanese Patent application 2009-013980, (2 pages).
Patent Abstracts of Japan, and English machine translation of Japanese Publication 08-013179 listed above, (9 pages).
Patent Abstracts of Japan, and English machine translation of Japanese Publication 2007-157420 listed above, (21 pages).

*Primary Examiner* — Jane Rhee
(74) *Attorney, Agent, or Firm* — Christie, Parker & Hale, LLP

(57) ABSTRACT

A membrane-electrode assembly for a fuel cell including a first substrate and a second substrate and a catalyst layer between the first substrate and the second substrate is provided, where the first substrate is a polymer electrolyte membrane and the second substrate is a electrode substrate, or the first substrate is the electrode substrate and the second substrate is the polymer electrolyte membrane. The catalyst layer has a $h_1/t_1$ ratio of about 0.5 or more, where $s_1$ represents a point on the first substrate at one end of the catalyst layer, $h_1$ represents a distance between the first substrate and the second substrate, $s_2$ represents a point on the first substrate closest to $s_1$ at which a height (h) of the catalyst layer becomes $h_1$, and $t_1$ represents the distance between the $s_1$ and the $s_2$. The membrane-electrode assembly can include a greater amount of catalyst by decreasing a shadow effect, and thereby increasing its energy density.

20 Claims, 8 Drawing Sheets
(2 of 8 Drawing Sheet(s) Filed in Color)

MEMBRANE ELECTRODE ASSEMBLY FOR FUEL CELL, METHOD FOR MAKING THE SAME, AND FUEL CELL SYSTEM INCLUDING THE SAME

CROSS-REFERENCE TO RELATED APPLICATION

This application claims priority to and the benefit of Korean Patent Application No. 10-2008-0043947, filed in the Korean Intellectual Property Office on May 13, 2008, the entire content of which is incorporated herein by reference.

BACKGROUND OF THE INVENTION

1. Field of the Invention

The present invention relates to a membrane-electrode assembly for a fuel cell, a method of making the same, and a fuel cell system including the same.

2. Description of the Related Art

A fuel cell is a power generation system for producing electrical energy through an electrochemical redox reaction of an oxidant and hydrogen included in a hydrocarbon-based material such as methanol, ethanol, natural gas, etc.

Fuel cells provide a clean energy source that can replace power generation systems that burn fossil fuels. A typical fuel cell includes a stack composed of unit cells and produces various ranges of power output. Since it has four to ten times more energy density than a small lithium battery, the fuel cell may be utilized as a small portable power source.

Representative exemplary fuel cells include polymer electrolyte membrane fuel cells (PEMFC) and direct oxidation fuel cells (DOFC). The direct oxidation fuel cell includes a direct methanol fuel cell that uses methanol (DMFC) as a fuel.

In operation, a fuel of a fuel cell is supplied to an anode of the fuel cell and adsorbed on a catalyst layer (or catalysts) of the anode, and the fuel is oxidized to produce protons and electrons. The electrons are transferred into a cathode of the fuel cell via an external circuit, and the protons are transferred into the cathode through a polymer electrolyte membrane between the anode and the cathode. In addition, an oxidant is supplied to the cathode, and then the oxidant, protons, and electrons are reacted on a catalyst layer (or catalysts) of the cathode to produce electricity along with water.

The catalyst layer of the anode and/or the catalyst layer of the cathode is formed only in a set or predetermined area of the polymer electrolyte membrane by using a metal mask. However, a lot of time is required in using (or placing) the metal mask to form a catalyst layer, and the metal mask may cause a shadow effect in which the catalyst layer is not formed on an edge portion of an upper surface of the catalyst layer because it is shielded by the metal mask due to the thickness thereof.

SUMMARY OF THE INVENTION

An aspect of an embodiment of the present invention is directed toward an improved membrane-electrode assembly including a large amount of catalyst and having high energy per unit volume.

In one embodiment, a membrane-electrode assembly for a fuel cell includes a first substrate, a second substrate facing the first substrate, and a catalyst layer between the first substrate and the second substrate and having a $h_1/t_1$ ratio of about 0.5 or more, or more specifically, about 0.5 and about 2, where, $s_1$ represents a point on the first substrate at one end of the catalyst layer, $h_1$ represents a distance between the first substrate and the second substrate, $s_2$ represents a point on the first substrate closest to $s_1$ at which a height (h) of the catalyst layer becomes $h_1$, and $t_1$ represents the distance between the $s_1$ and the $s_2$. In one embodiment, the first substrate is a polymer electrolyte membrane and the second substrate is an electrode substrate. In another embodiment, the first substrate is the electrode substrate and the second substrate is the polymer electrolyte membrane.

In one embodiment, the membrane-electrode assembly further includes a gasket surrounding an external periphery surface of the catalyst layer and for sealing the catalyst layer between the first substrate and the second substrate. The gasket may include an adhesive layer on a side of the gasket and is fixed to a region of the first substrate by the adhesive layer.

The adhesive layer may include a resin selected from the group consisting of silicone-based resins, epoxy-based resins, acryl-based resins, polyester-polyurethane polymer two-component resins, and combinations thereof. In one embodiment, the adhesive layer has a thickness between about 10 and about 50 μm.

In one embodiment, the electrode substrate and the catalyst layer are integrated as an anode or a cathode.

Another aspect of an embodiment of the present invention is directed toward a method of manufacturing a membrane-electrode assembly for a fuel cell. In one embodiment, a method of manufacturing a membrane-electrode assembly for a fuel cell includes fixing a gasket, which includes an adhesive layer on a side of the gasket, on a substrate by adhering the adhesive layer of the gasket to a region of the substrate, and forming a catalyst layer on the substrate by utilizing the gasket as a mask.

The substrate may be a polymer electrolyte membrane or an electrode substrate.

In one embodiment, the gasket has a thickness between about 100 and about 300 μm, and/or the adhesive layer has a thickness between about 10 and about 50 μm.

Another aspect of an embodiment of the present invention is directed toward a fuel cell system that includes at least one electricity generating element having a membrane-electrode assembly, a fuel supplier for supplying a fuel to the electricity generating element, and an oxidant supplier for supplying an oxidant to the electricity generating element, where the membrane-electrode assembly is the same or substantially the same as the aforementioned membrane-electrode assembly.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1A:
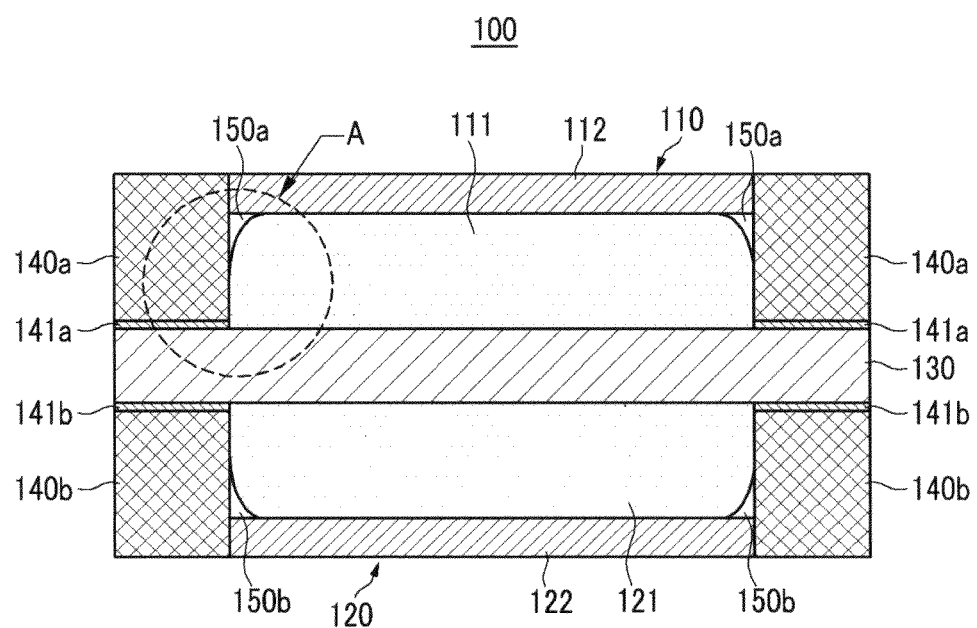
FIG. 1A is a schematic cross-sectional view showing a membrane-electrode assembly according to an embodiment of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Also, in the context of the present application, when an element is referred to as being "on" another element, it can be directly on the another element or be indirectly on the another element with one or more intervening elements interposed therebetween. Like reference numerals designate like elements throughout the specification.

Figure 1B:
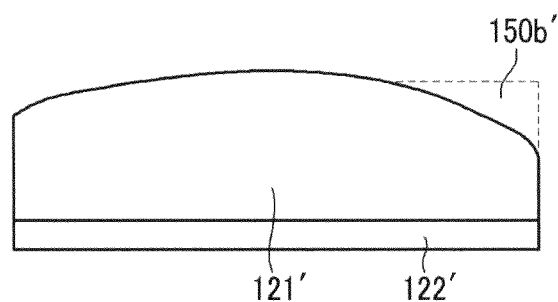
FIG. 1B is a schematic cross-sectional view showing a membrane-electrode assembly according to another embodiment of the present invention.

FIGS. 1A and 1B are schematic views showing a cross-section of a membrane-electrode assembly according to various embodiments of the present invention. The cross-sectional view of each of FIGS. 1A and 1B shows a substrate cut along the symmetric axis parallel to one side of the substrate formed with a catalyst layer.

Generally, there are two methods of manufacturing membrane-electrode assemblies for a fuel cell. The first method includes initially coating a catalyst layer on an electrode substrate and then laminating it with a polymer electrolyte membrane to provide a membrane-electrode assembly. The second method includes initially forming a catalyst layer on either side (or surface) of a polymer electrolyte membrane and then laminating it with an electrode substrate to provide a membrane-electrode assembly. The first method is referred to as a catalyst coated substrate (CCS) method, and the second method is referred to as a catalyst coated membrane (CCM) method.

As such, if the catalyst layer is formed in accordance with the CCS method, a base substrate can be an electrode substrate; and if the catalyst layer is formed in accordance with the CCM method, the base substrate (or the substrate) can be a polymer electrolyte membrane.

FIG. 1A shows the case of forming the catalyst layer in accordance with the CCM method. In other words, FIG. 1A shows the case in which a polymer electrolyte membrane 130 is utilized as a base substrate (or as a substrate).

FIG. 1B shows the case of forming the catalyst layer in accordance with the CCS method. The catalyst layer is formed on an electrode substrate in this method.

Referring to FIG. 1A, a membrane-electrode assembly 100 includes an anode 110, a cathode 120, and the polymer electrolyte membrane 130 between the anode 120 and the cathode 120.

The anode 110 includes an anode catalyst layer 111 for transforming hydrogen into protons and electrons through an oxidation reaction and an anode substrate 112 for supporting the anode catalyst layer 111. The cathode 120 includes a cathode catalyst layer 121 for generating heat of a set or predetermined temperature and moisture through a reduction reaction with the protons and the oxidant and a cathode substrate 122 for supporting the cathode catalyst layer 121. Here, the polymer electrolyte membrane 130 is utilized as an ion-exchange membrane by transmitting protons generated from the anode 110 to the cathode 120.

In addition, the membrane-electrode assembly 100 includes gaskets 140a and 140b surrounding the external circumferential surface of the anode catalyst layer 111 and the cathode catalyst layer 121 and for sealing the catalyst layer 121. According to one embodiment, each of the gaskets 140a and 140b respectively includes an adhesive layer 141a, 141b on one surface thereof. The adhesive layers 141a and 141b are used to attach the gaskets 140a and 140b to the polymer electrolyte membrane 130, and may include a material that is water resistance, heat resistance, and/or acid resistance.

In another embodiment, the adhesive layers 141a and 141b include a heat-resistant adhesive capable of withstanding heat generated during an operation of the fuel cell. In one embodiment, the adhesive layers 141a and 141b can resist heat between 150 and 200° C.

Non-limiting examples of suitable adhesives include resins selected from the group consisting of silicone-based resins, epoxy-based resins, acryl-based resins, two-component polymer resins of polyester-polyurethane, and combinations thereof. The adhesive layers 141a and 141b have a thickness between 10 and 50 um, and in another embodiment, they have a thickness between 20 and 40 μm, in order to accomplish the adhesion and sealing functions.

Referring to FIG. 1B, since a catalyst layer 121' (e.g., a cathode catalyst layer) is formed on an electrode substrate 122' (e.g., a cathode substrate), an empty space 150b' as shown in FIG. 1B is formed.

According to one embodiment of the present invention, since the gaskets 140a and 140b including the adhesive layers 141a and 141b are used as a mask to form the catalyst layer, the membrane-electrode assembly 100 can decrease the shadow effect caused by the catalyst layer not forming at the edge portion of an upper surface of the catalyst layer due to the mask. Reference numbers 150a and 150b in FIG. 1A represent empty spaces at which the catalyst layer is not formed due to the shadow effect.

Figure 2:
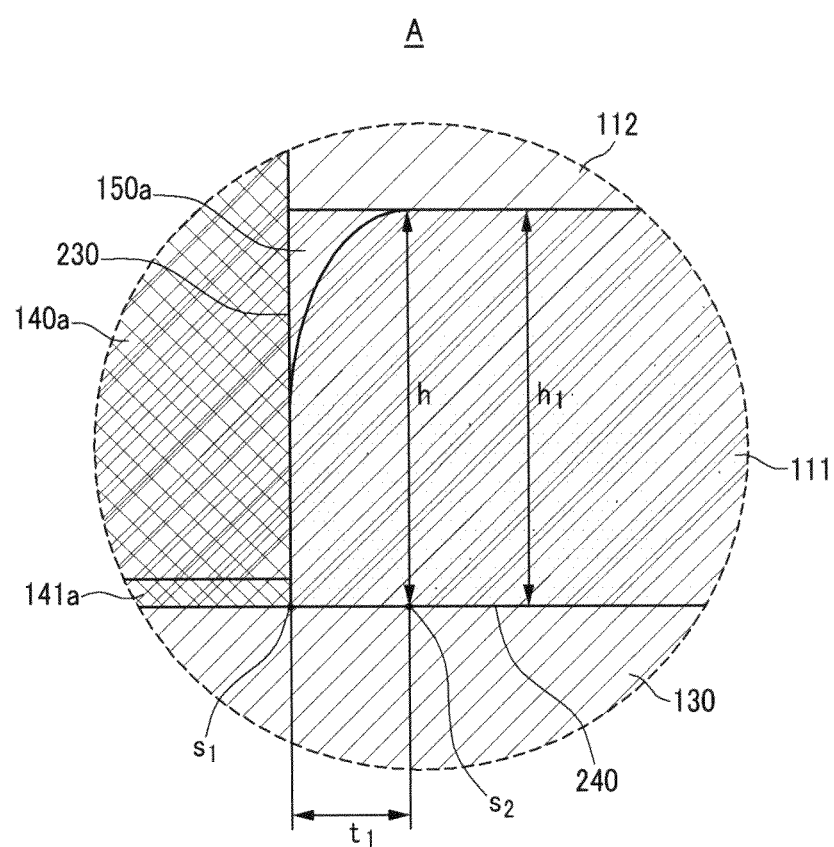
FIG. 2 is an enlarged view showing area A in FIG. 1A.

FIG. 2 is an enlarged view of area A shown in FIG. 1A. FIG. 2 uses the same reference numbers as in FIG. 1A when referring to the same elements. Referring to FIG. 2, a point $s_1$ is on the substrate 240 at a first end 230 of the catalyst layer 111; a distance $h_1$ is between the polymer electrolyte membrane 130 and the anode substrate 112; h represents a height of the catalyst layer 111 at a point of s; $s_2$ represents a point that is the closest to the point $s_1$ among points s's of which h is the same as $h_1$; and $t_1$ represents the distance between the $s_1$ and the $s_2$.

In one embodiment, that catalyst layer has a $h_1/t_1$ ratio of 0.5 or more. In another embodiment, the $h_1/t_1$ ratio is 1 or more, or more particularly, 1.5 or more. In one embodiment, when the $h_1/t_1$ ratio is 0.5 or more, the effective area of the catalyst layer is increased as the amount of catalyst present in the same volume is increased. The greater the $h_1/t_1$ ratio is, the higher the energy density per unit volume is. However, it is difficult to provide a catalyst layer with the $h_1/t_1$ ratio of more than 2.

As the $h_1$ value is highly dependent upon the manufacturing process of the electrode, it should not be limited to a particular range. That is, because generally in a case of a polymer electrolyte fuel cell (PEMFC), the coating amount of catalyst is around 0.2 mg/cm$^2$, and in a case of a direct methanol oxidation fuel cell (DMFC), the coating amount of catalyst is abound 4 mg/cm², it would not be meaningful to define the absolute thickness of a polymer electrolyte and a substrate.

According to another embodiment of the present invention, a method of manufacturing a membrane-electrode assembly is provided. The method includes fixing a gasket having an adhesive layer on one surface on the substrate by letting the adhesive layer of the gasket adhere to a certain area of the substrate, and forming a catalyst layer on the substrate by using the gasket as a mask.

When the catalyst layer is formed in accordance with the CCS (the catalyst layer is formed on an electrode substrate) method, the substrate may be an electrode substrate. When the catalyst layer is formed in accordance with the CCM (the catalyst layer is formed on a polymer electrolyte membrane) method, the substrate may be a polymer electrolyte membrane.

Figure 3:
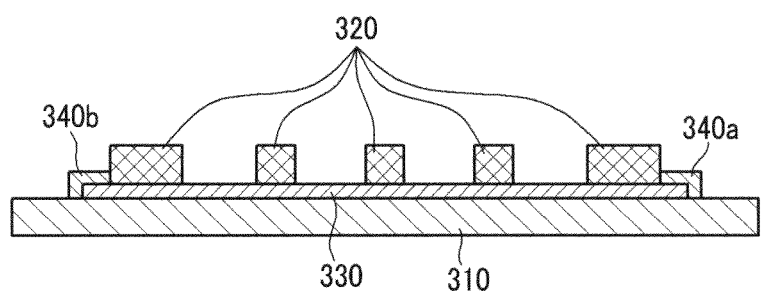
FIG. 3 is a cross-sectional view showing a method of manufacturing a conventional membrane-electrode assembly by using a mask.

FIG. 3 is a cross-sectional view showing a method of manufacturing a conventional membrane-electrode assembly by using a metal mask. Referring to FIG. 3, a polymer electrolyte membrane 330 is fixed by using a metal mask 320 on a rubber magnetic plate 310, and the edge of polymer electrolyte membrane 330 is affixed with tapes 340a and 340b in order to prevent or reduce shrinking of the polymer electrolyte membrane 330. The coating layer is formed by a coating method such as screen printing, spraying, or doctor blade coating, on the polymer electrolyte membrane 330 formed with the metal mask 320, and then the metal mask 320 is removed.

In the case of the method of manufacturing the conventional membrane-electrode assembly, it requires a lot of time to put the polymer electrolyte membrane 330 and the metal mask 320 on the rubber magnet plate 310, and it is difficult to arrange the polymer electrolyte membrane 330 with the anode when the anode catalyst layer is formed on one surface of the polymer electrolyte membrane 330. Next, the cathode catalyst layer is formed on the other surface of the polymer electrolyte membrane 330. In addition, when a magnetic force is insufficient between the metal mask 320 and the rubber magnetic plate 310, the polymer electrolyte membrane 330 may shrink when the catalyst layer is formed.

In order to maintain at least a certain or adequate level of magnetic force between the metal mask 320 and the rubber magnetic plate 310, the metal mask 320 should have a thickness of at least a certain level. When the metal mask 320 having a thickness of the certain level (or more) is used, it causes the shadow effect in which the catalyst layer is not formed on an edge area of an upper surface of the catalyst layer by the shadow of the metal mask while the catalyst layer is formed.

Figure 4:
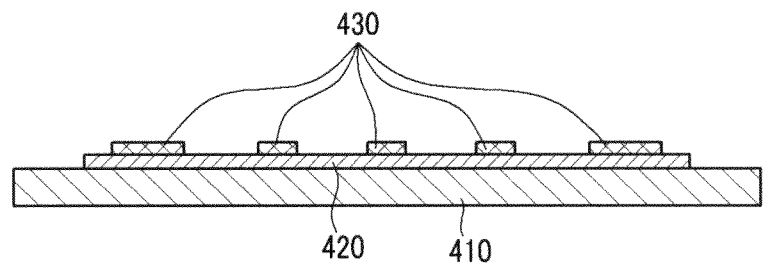
FIG. 4 is a cross-sectional view showing a method of manufacturing a membrane-electrode assembly according to an embodiment of the present invention.

FIG. 4 is a cross-sectional view showing a method of manufacturing a membrane-electrode assembly according to an embodiment of the present invention. While FIG. 4 shows the case in which the catalyst is formed in accordance with the CCM method, the present invention is not limited thereto, and the catalyst layer can be formed in accordance with the CCS method.

Referring to FIG. 4, a method of manufacturing of a membrane-electrode assembly according to one embodiment of the present invention includes fixing a polymer electrolyte membrane 420 on a vacuum plate 410, and fixing a gasket 430 having an adhesive layer on one surface on the polymer electrolyte membrane 420 by causing the adhesive layer 420 of the gasket 430 to adhere to a certain area of the polymer electrolyte membrane 420. When using the gasket 430 as a mask, the catalyst layer is formed by a coating method, such as screen printing, spraying, or doctor blade coating, on the polymer electrolyte membrane 420 except at the area where the gasket 430 is attached.

When the gasket 430 including the adhesive layer is used as a mask while the catalyst layer is formed, the gasket 430 can decrease the shadow effect because the gasket 430 has a smaller thickness than that of a metal mask. Also, even after the catalyst layer is formed, the gasket 430 still remains, so it is not difficult to confirm the anode pattern when the anode catalyst layer is formed on one surface (or side) of the polymer electrolyte membrane 420. The cathode catalyst layer is then formed on the opposite surface.

In one embodiment, the thickness of the gasket 430 having the adhesive layer is between 100 and 300 μm; and, in another embodiment, it is between 150 and 200 μm. In one embodiment, when the thickness of the gasket 430 is less than 100 μm, it is problematic to form the pattern of the electrode. In another embodiment, when the thickness of the gasket 430 is more than 300 μm, it causes significant shadow effects. In comparison, the thickness of metal mask is about 700 μm in FIG. 3.

In addition, because the polymer electrolyte membrane 420 is fixed on the vacuum plate 410, it can prevent or reduce shrinkage of the polymer electrolyte membrane 420 due to solvent volatilization of the composition for a catalyst layer when the catalyst layer is being formed.

The adhesive layer adheres the gasket 430 to the polymer electrolyte membrane 420, and it may include any suitable material having water resistance, heat resistance, and/or acid-resistance in order to achieve sufficient sealing.

The material for the adhesive layer can include heat resistant adhesives that are capable of enduring heat generated while the fuel cell is operated. In one embodiment, the material is heat resistant at a temperature between 150 and 200° C.

Non-limiting examples of suitable adhesives include resins selected from the group consisting of silicone-based resins, epoxy-based resins, acryl-based resins, two-component polymer resins of polyester-polyurethane, and combinations thereof. According to one embodiment, the adhesive layer has a thickness between 10 and 50 μm, and, in another embodiment, the adhesive layer has a thickness between 20 and 40 μm in order to accomplish the adhesion and sealing functions.

The gasket 430 including the adhesive layer can be fixed to the polymer electrolyte membrane 420 through curing the adhesive layer. The curing of the adhesive layer is dependent upon the material of the adhesive layer. In another embodiment, the adhesive layer is irradiated by ultraviolet rays or x-rays, or is heated such that it does not affect the physical properties of the polymer electrolyte membrane 420.

According to another embodiment, a fuel cell system is provided to include an electricity generating element including a membrane-electrode assembly according to an embodiment of the present invention as described herein, a fuel supplier for supplying a fuel to the electricity generating element, and an oxidant supplier for supplying an oxidant to the electricity generating element.

Figure 5:
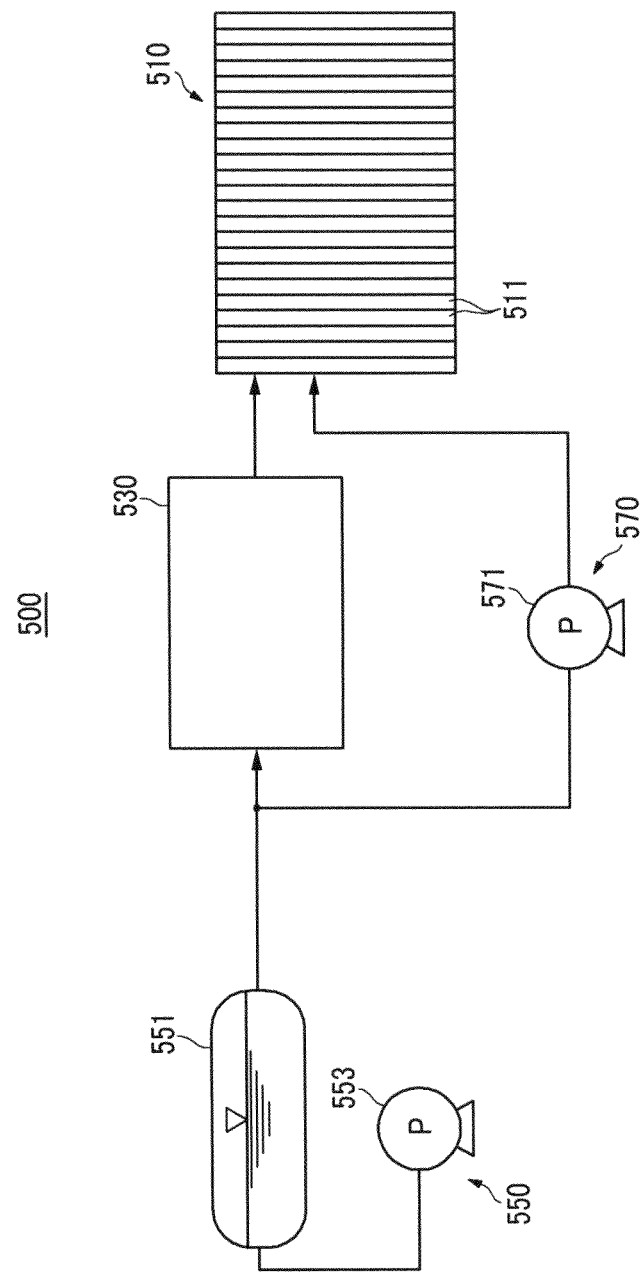
FIG. 5 is a schematic view showing a structure of a fuel cell system according to an embodiment of the present invention.
Figure 6:
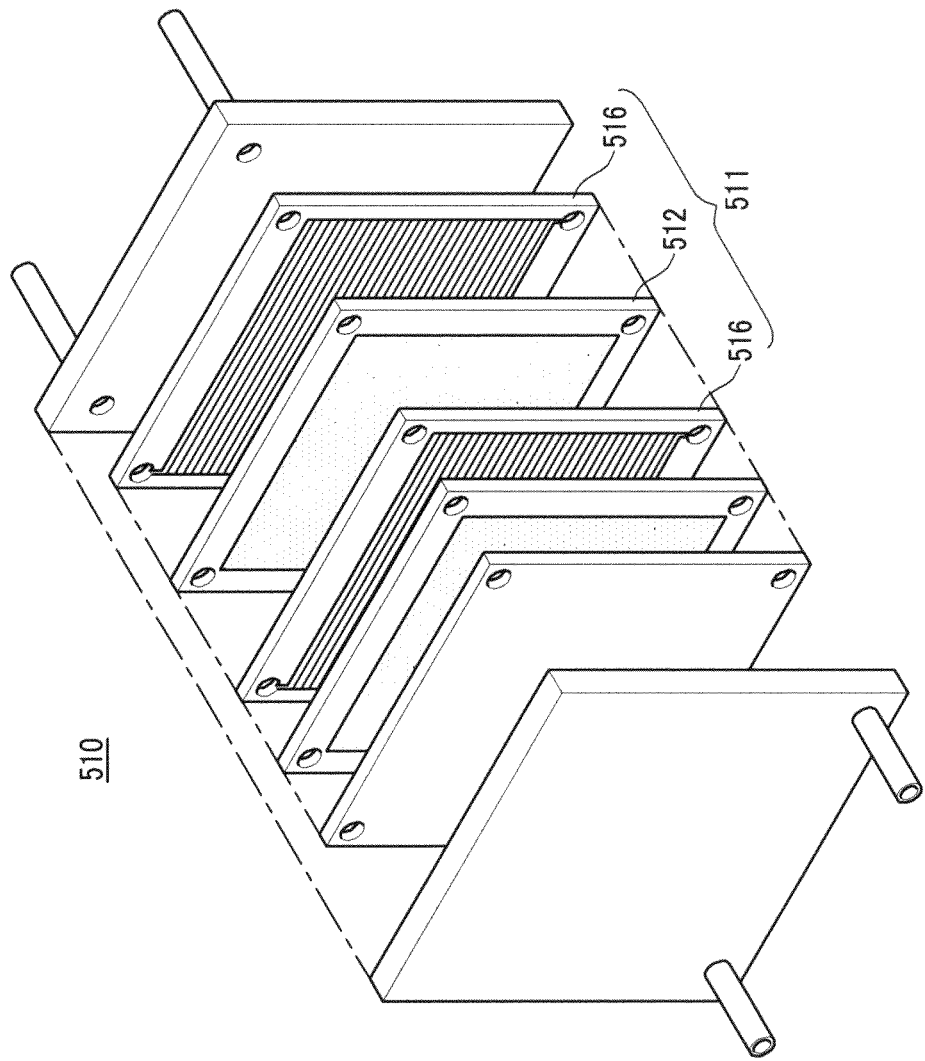
FIG. 6 is an exploded perspective view showing a structure of a stack shown in FIG. 5.

FIG. 5 is a schematic view showing the structure of fuel cell system according to an embodiment of the present invention, and FIG. 6 is an exploded perspective view showing a structure of a stack 510 shown in FIG. 5.

Referring to FIG. 5, a fuel cell system 500 utilizes a polymer electrode membrane fuel cell (PEM) form that generates hydrogen through reforming (or modifying) a fuel including hydrogen and generates electrical energy through an oxidation reaction of hydrogen and a reduction reaction of an oxidant.

In the fuel cell system 500, the oxidant may include oxygen or air including oxygen stored in a separated storing space.

The fuel cell system 500 also includes an electricity generating element 511 for generating electrical energy by inducing oxidation and reduction reactions of the reformed fuel (or reformed gas) from the reformer 530 and the oxidant; a fuel supplier 550 for supplying fuel to the reformer 530; the reformer 530 for reforming the fuel to generate the reformed fuel (or hydrogen-rich fuel) and for supplying the hydrogen (or reformed fuel or hydrogen-rich fuel) to the electricity generating element 511; and an oxidant supplier 570 for supplying the oxidant to the reformer 530 and the electricity generating element 511. Multiple electricity generating elements 511 are stacked (or laminated) together to form a stack 510.

When the fuel cell system 500 operates, hydrogen generated from the reformer is supplied to the electricity generating elements 511 of the stack 510, the oxidant is supplied to the electricity generating elements 511, and the stack generates electrical energy having a set or predetermined output, water, and heat through oxidation reactions of hydrogen and reduction reactions of the oxidant.

The reformer 530 has a structure for generating the hydrogen-rich fuel from the fuel including hydrogen and to supply the hydrogen-rich fuel to the stack 510. The reformer 530 generates the hydrogen-rich fuel from the fuel through steam reforming (SR), autothermal reforming (ATR), and/or partial oxidation (POX), and supplies the hydrogen-rich fuel to the stack 510. In addition, the reformer 530 may optionally include a carbon monoxide decreasing part that oxidizes carbon monoxide in the fuel.

The fuel supplier 550 for supplying the fuel to the reformer 530 includes a fuel tank 551 for storing the fuel, and a fuel pump 553 connected to the fuel tank 551 and for discharging fuel from the fuel tank 551.

The oxidant supplier 570 includes an oxidant pump 571 for drawing in the oxidant with a certain pumping force and for supplying the oxidant to each of the electricity generating elements 511 of the stack 510 and the reformer 530. The oxidant supplier 570 supplies the oxidant to the stack 510 and the reformer 530 through a single oxidant pump 571 as shown in FIG. 5, but it is not limited thereto, and it may include two oxidant pumps respectively connected to the stack 510 and the reformer 530.

Referring to FIG. 6, the stack 510 is provided by stacking the electricity generating elements 511. The electricity generating element 511 forms a single unit of a fuel cell having the membrane-electrode assembly 512 at the center and separators (also called bipolar plates) 516 on both surfaces thereof.

The following examples illustrate the present invention in more detail. However, it should be understood that the present invention is not limited by these examples.

Manufacturing Membrane-Electrode Assembly

Example 1

A 125 μm thick NAFION 115 Membrane™ (manufactured by DuPont) was treated in a 3% hydrogen peroxide solution and a 0.5M sulfuric acid aqueous solution at 90° C. for 2 hours, and then washed in deionized water at 100° C. for one hour to prepare a H$^+$ type NAFION 115 membrane. The obtained membrane was used as a polymer electrolyte membrane.

A two-component resin adhesive polymer of polyester and polyurethane was coated on one surface of a gasket in an amount between 2 and 3 g/m$^2$ by using a bar coater and dried to provide a gasket including an adhesive layer having a thickness of 10 μm.

The gasket was contacted to the polymer electrolyte membrane in a manner such that the adhesive layer of the gasket faced the polymer electrolyte membrane and cured at a temperature of 60° C. for 24 hours to fix the gasket on the polymer electrolyte membrane. The gasket had a thickness of about 150 μm.

10 g of a 10 wt % NAFION™ (manufactured by DuPont) aqueous dispersion was added to 3.0 g of Pt/C (20 wt %, manufactured by E-tek) in 30 ml of isopropyl alcohol and mechanically agitated to provide a composition for a cathode catalyst layer.

The polymer electrolyte membrane attached with the gasket was placed on a vacuum plate, and the gasket was used as a mask. The composition for the cathode catalyst layer was coated on one surface of the polymer electrolyte membrane by spray printing to provide a cathode catalyst layer. The area for forming the cathode catalyst layer was 5×5 cm$^2$, and the loading amount of catalyst was 3 mg/cm$^2$. An anode catalyst layer was then formed on the other surface of the polymer electrolyte membrane in accordance with the substantially same procedure as above.

The polymer electrolyte membrane having surfaces formed with the cathode catalyst layer and the anode catalyst layer was then placed between two electrode substrates, and together they were pressed at 135° C., 300 psi, for 3 minutes to join the electrode substrates to the polymer electrolyte membrane to provide a membrane-electrode assembly.

Comparative Example 1

A 125 μm thick NAFION™ 115 membrane (manufactured by DuPont) was treated in 3% hydrogen peroxide and a 0.5M sulfuric acid aqueous solution at 90° C. for 2 hours and washed in deionized water at 100° C. for 1 hour to produce a H$^+$ type NAFION 115 membrane for use as a polymer electrolyte membrane.

10 g of a 10 wt % NAFION™ (manufactured by DuPont) aqueous dispersion was added to 3.0 g of Pt/C (20 wt %, manufactured by E-tek) in 30 ml of isopropyl alcohol and mechanically agitated to provide a composition for a cathode catalyst layer.

The polymer electrolyte membrane was fixed on a rubber magnetic plate by using a metal mask and the edge of the polymer electrolyte membrane was affixed with tape. The composition for a cathode catalyst layer was coated on one surface of a polymer electrolyte membrane formed with the metal mask by screen printing to provide a cathode catalyst layer, and the metal mask was removed. The area for forming the cathode catalyst layer was 5×5 cm$^2$, and the catalyst loading amount was 3 mg/cm$^2$. An anode catalyst layer was then formed on the other surface of the polymer electrolyte membrane in accordance with substantially the same procedure as in the above.

A gasket was put on the external circumferential surface of the catalyst layer at which the metal mask was present. The polymer electrolyte membrane formed with the cathode catalyst layer and the anode catalyst layer was then placed between two electrode substrates, and they were pressed at 135° C., 300 psi, for 3 minutes by using a compression molder to join the electrode substrates to the polymer electrolyte membrane to provide a membrane-electrode assembly.

Observing Optical Microscope

Figure 7:
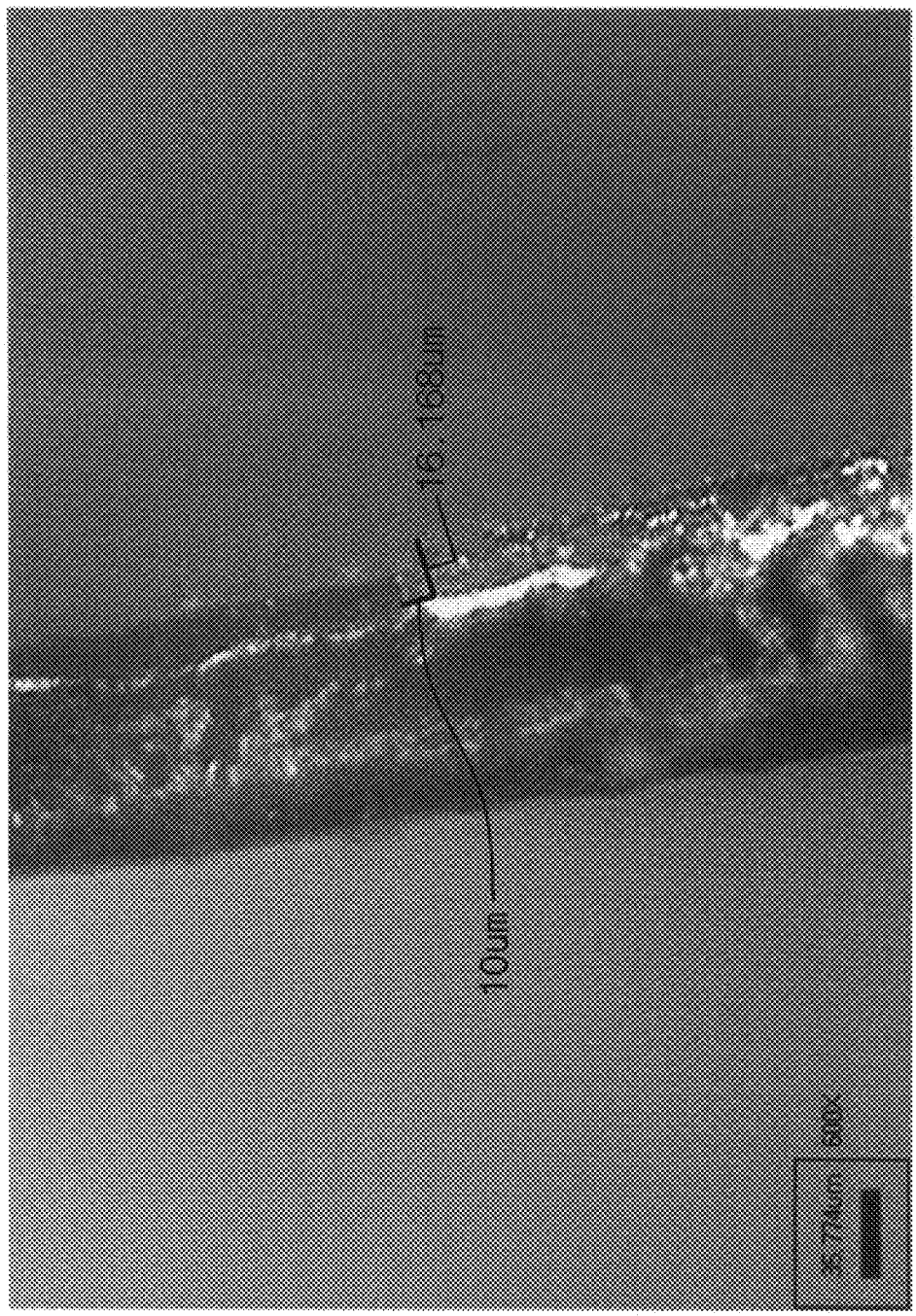
FIG. 7 is an optical microscope photograph of a membrane-electrode assembly according to Example 1 of the present invention.
Figure 8:
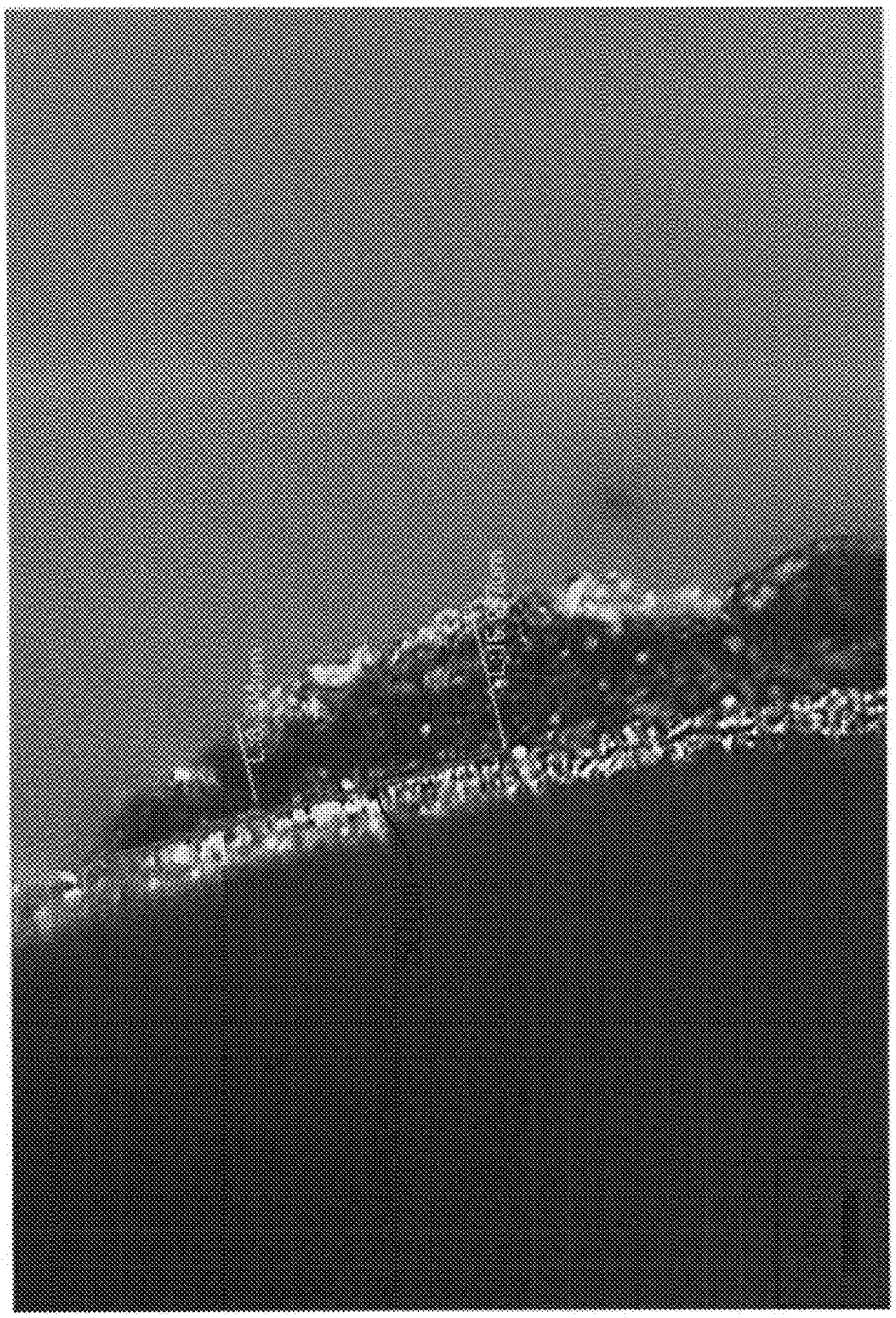
FIG. 8 is an optical microscopic photograph of a membrane-electrode assembly according to Comparative Example 1.

A cross-sectional surface of the polymer electrolyte membrane that was cut in a perpendicular direction with respect to the polymer electrolyte membrane along with the symmetric axis parallel to one side of the membrane-electrode assembly including the polymer electrolyte membrane formed with the catalyst layers obtained from Example 1 was observed with a optical microscope, and the result is shown in FIG. 7. In addition, a cross-sectional surface of the polymer electrolyte membrane that was cut in a perpendicular direction with respect to the polymer electrolyte membrane along with the symmetric axis parallel to one side of the membrane-electrode assembly including the polymer electrolyte membrane formed with the catalyst layers obtained from Comparative Example 1 was also observed with a optical microscope, and the result is shown in FIG. 8.

Referring to FIGS. 2 and 7, the membrane-electrode assembly of Example 1 has a catalyst layer height ($h_1$) (or the distance between the polymer electrolyte membrane and the substrate) of about 16 μm, and a distance ($t_1$) of about 10 μm. Referring to FIGS. 2 and 8, in contrast, the membrane-electrode assembly of Comparative Example 1 has a height ($h_1$) of about 16 μm and a distance ($t_1$) of about 50 μm. In other words, it should be apparent that in the case of Example 1, the ratio of $h_1/t_1$ is about 1.6, and in the case of Comparative Example 1, the ratio of $h_1/t_1$ is about 0.32.

Measurement of Fuel Cell Performance

Figure 9:
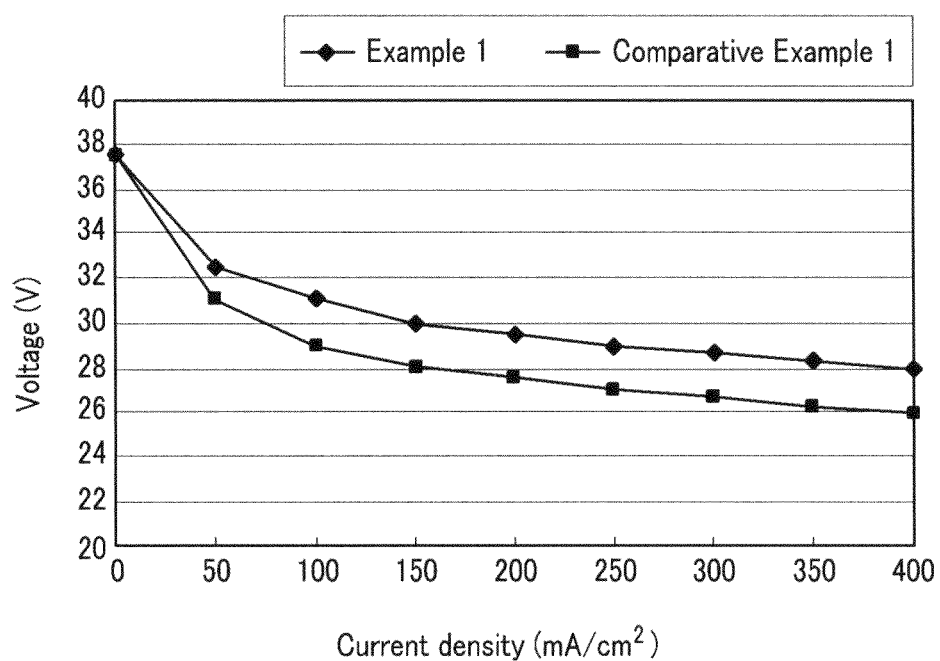
FIG. 9 is a graph showing performances of fuel cells obtained from Example 1 of the present invention and Comparative Example 1.

The fuel cells obtained from Example 1 and Comparative Example 1 were measured to determine the voltage characteristics based on the current density, and the results are shown in FIG. 9.

As shown in FIG. 9, it is confirmed that the fuel cell of Example 1 had better performance than that of the fuel cell of Comparative Example 1. This is a result of using the adhesive gasket in the fuel cell of Example 1 when the membrane-electrode assembly was prepared. The gasket helps to decrease the shadow effect when the catalyst layer is formed, and thereby enables the fuel cell to have an increased energy per unit volume.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A membrane-electrode assembly for a fuel cell, comprising:
    a first substrate;
    a second substrate facing the first substrate; and
    a catalyst layer between the first substrate and the second substrate and having a $h_1/t_1$ ratio of about 0.5 or more, wherein:
        $s_1$ represents a point on the first substrate at one end of the catalyst layer;
        $h_1$ represents a distance between the first substrate and the second substrate;
        $s_2$ represents a point on the first substrate closest to $s_1$ at which a height (h) of the catalyst layer becomes $h_1$; and
        $t_1$ represents the distance between the $s_1$ and the $s_2$, and
    wherein the first substrate is a polymer electrolyte membrane and the second substrate is an electrode substrate, or the first substrate is the electrode substrate and the second substrate is the polymer electrolyte membrane.

2. The membrane-electrode assembly of claim 1, wherein the $h_1/t_1$ ratio is between about 0.5 and about 2.

3. The membrane-electrode assembly of claim 1, further comprising a gasket surrounding an external periphery surface of the catalyst layer and for sealing the catalyst layer between the first substrate and the second substrate.

4. The membrane-electrode assembly of claim 3, wherein the gasket comprises an adhesive layer on a side of the gasket and is fixed to a region of the first substrate by the adhesive layer.

5. The membrane-electrode assembly of claim 4, wherein the adhesive layer comprises a resin selected from the group consisting of silicone-based resins, epoxy-based resins, acryl-based resins, polyester-polyurethane polymer two-component resins, and combinations thereof.

6. The membrane-electrode assembly of claim 5, wherein the adhesive layer has a thickness between about 10 and about 50 μm.

7. The membrane-electrode assembly of claim 1, wherein the electrode substrate and the catalyst layer are integrated as an anode or a cathode.

8. A method of manufacturing a membrane-electrode assembly for a fuel cell, the method comprising:
    fixing a gasket, comprising an adhesive layer on a side of the gasket, on a first substrate by adhering the adhesive layer of the gasket to a region of the first substrate;
    forming a catalyst layer on the first substrate by utilizing the gasket as a mask; and
    fixing a second substrate on the catalyst layer,
    wherein the catalyst layer has a $h_1/t_1$ ratio of about 0.5 or more, where:
        $s_1$ represents a point on the first substrate at one end of the catalyst layer;
        $h_1$ represents a distance between the first substrate and the second substrate;
        $s_2$ represents a point on the first substrate closest to $s_1$ at which a height (h) of the catalyst layer becomes $h_1$; and
        $t_1$ represents the distance between the $s_1$ and the $s_2$.

9. The method of claim 8, wherein the substrate is a polymer electrolyte membrane.

10. The method of claim 8, wherein the substrate is an electrode substrate.

11. The method of claim 8, wherein the gasket has a thickness between about 100 and about 300 μm.

12. The method of claim 8, wherein the adhesive layer has a thickness between about 10 and about 50 μm.

13. The method of claim 8, wherein the adhesive layer comprises a resin selected from the group consisting of silicone-based resins, epoxy-based resins, acryl-based resins, polyester-polyurethane polymer two-component resins, and combinations thereof.

14. A fuel cell system comprising:
    at least one electricity generating element comprising:
    a membrane-electrode assembly,
    a fuel supplier for supplying a fuel to the electricity generating element, and
    an oxidant supplier for supplying an oxidant to the electricity generating element,
    wherein the membrane-electrode assembly comprises:
        an anode;
        a cathode;
        a polymer electrolyte membrane between the anode and the cathode,
            each of the anode and cathode comprising an electrode substrate and a catalyst layer, and
            the catalyst layer being between the electrode substrate and the polymer electrolyte membrane and having a $h_1/t_1$ ratio of about 0.5 or more, wherein:
- $s_1$ represents a point on a first substrate at one end of the catalyst layer;
- $h_1$ represents a distance between the first substrate and a second substrate;
- $s_2$ represents a point on the first substrate closest to $s_1$ at which a height (h) of the catalyst layer becomes $h_1$; and
- $t_1$ represents the distance between the $s_1$ and the $s_2$, and wherein the first substrate is the polymer electrolyte membrane and the second substrate is the electrode substrate, or the first substrate is the electrode substrate and the second substrate is the polymer electrolyte membrane.

15. The fuel cell system of claim 14, wherein the $h_1/t_1$ ratio is between about 0.5 and about 2.

16. The fuel cell system of claim 14, wherein the membrane-electrode assembly further comprises a gasket surrounding an external periphery surface of the catalyst layer and for sealing the catalyst layer between the electrode substrate and the polymer electrolyte membrane.

17. The fuel cell system of claim 16, wherein the gasket has an adhesive layer on a side of the gasket and is fixed to a region of the first substrate by the adhesive layer.

18. The fuel cell system of claim 17, wherein the adhesive layer comprises a resin selected from the group consisting of silicone-based resins, epoxy-based resins, acryl-based resins, polyester-polyurethane polymer two-component resins, and combinations thereof.

19. The fuel cell system of claim 17, wherein the adhesive layer has a thickness between about 10 and about 50 μm.

20. The fuel cell system of claim 16, wherein the gasket has a thickness between about 100 and about 300 μm.

\* \* \* \* \*